US011081135B2

(12) United States Patent
Qiang et al.

(10) Patent No.: US 11,081,135 B2
(45) Date of Patent: Aug. 3, 2021

(54) SHINGLED MAGNETIC RECORDING STORAGE SYSTEM

(71) Applicant: Seagate Technology LLC, Cupertino, CA (US)

(72) Inventors: Jian Qiang, Singapore (SG); Xiong Liu, Singapore (SG); WenXiang Xie, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 141 days.

(21) Appl. No.: 16/653,732

(22) Filed: Oct. 15, 2019

(65) Prior Publication Data

US 2020/0043526 A1 Feb. 6, 2020

Related U.S. Application Data

(63) Continuation of application No. 15/656,278, filed on Jul. 21, 2017, now Pat. No. 10,460,760.

(51) Int. Cl.
*G11B 5/012* (2006.01)
*G11B 20/18* (2006.01)
(Continued)

(52) U.S. Cl.
CPC ...... *G11B 20/1816* (2013.01); *G06F 12/0871* (2013.01); *G06F 12/0875* (2013.01); *G06F 12/0888* (2013.01); *G11B 5/012* (2013.01); *G11B 20/10527* (2013.01); *G11B 20/1217* (2013.01); *G06F 12/0868* (2013.01);
(Continued)

(58) Field of Classification Search
CPC .......... G11B 20/1816; G11B 20/10527; G11B 5/012; G11B 20/1217; G11B 2020/183; G11B 2020/10657; G11B 2020/1238; G06F 12/0888; G06F 12/0871; G06F 12/0875; G06F 12/0868; G06F 2212/313; G06F 2212/502; G06F 2212/1016
See application file for complete search history.

(56) References Cited

U.S. PATENT DOCUMENTS 8,947,817 B1  2/2015  Chung et al.
9,099,155 B1  8/2015  Kataria et al.
(Continued)

*Primary Examiner* — Tasnima Matin
(74) *Attorney, Agent, or Firm* — Holzer Patel Drennan

(57) ABSTRACT

The disclosed technology provides a method that improves CCT in SMR device systems. In one implementation, the method comprises writing data to a shingled magnetic recording (SMR) band in a storage device, determining whether an off-track write has occurred, identifying unsafe written data in response to determining that an off-track write has occurred, determining whether caching space is available upon identifying unsafe written data, continue writing data to the SMR band without a write retry upon determining that caching space is available, and writing unsafe written data to the available caching space. In another implementation, the method comprises receiving a request to repair an encroached track in an SMR band, recovering encroached data to a dynamic random-access memory, determining whether caching space is available, writing the recovered data to the available caching space upon determining that caching space is available, and merging other cached data in the SMR band.

20 Claims, 5 Drawing Sheets

(51) Int. Cl.
*G11B 20/12* (2006.01)
*G06F 12/0875* (2016.01)
*G06F 12/0888* (2016.01)
*G06F 12/0871* (2016.01)
*G11B 20/10* (2006.01)
*G06F 12/0868* (2016.01)

(52) U.S. Cl.
CPC ............... *G06F 2212/1016* (2013.01); *G06F 2212/313* (2013.01); *G06F 2212/502* (2013.01); *G11B 2020/10657* (2013.01); *G11B 2020/1238* (2013.01); *G11B 2020/183* (2013.01)

(56) References Cited

U.S. PATENT DOCUMENTS

| | | |
|---|---|---|
| 9,269,376 B1 | 2/2016 | Hess et al. |
| 9,373,347 B2 | 6/2016 | Kim et al. |
| 9,495,988 B1 | 11/2016 | Liu et al. |
| 2014/0177085 A1 | 6/2014 | Haga et al. |
| 2015/0109700 A1* | 4/2015 | Kashiwase ............... G11B 5/09 360/77.04 |
| 2015/0294684 A1 | 10/2015 | Qjang et al. |
| 2016/0034342 A1 | 2/2016 | Toh et al. |
| 2016/0372143 A1 | 12/2016 | Qiang et al. |
| 2017/0123944 A1* | 5/2017 | Macko ................ G06F 11/1076 |

\* cited by examiner

SHINGLED MAGNETIC RECORDING STORAGE SYSTEM

CROSS-REFERENCE TO RELATED APPLICATIONS

The present application is a continuation of U.S. patent application Ser. No. 15/656,278, entitled "Shingled Magnetic Recording System," and filed on Jul. 21, 2017, the content of which is specifically incorporated by reference herein for all that it discloses or teaches.

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

SUMMARY

The disclosed technology provides a method that improves command completion time (CCT) in SMR device systems. In one implementation, the method comprises writing data to a shingled magnetic recording (SMR) band in a storage device, determining whether an off-track write has occurred, identifying unsafe written data in response to determining that an off-track write has occurred, determining whether caching space is available upon identifying unsafe written data, continue writing data to the SMR band without a write retry upon determining that caching space is available, and writing unsafe written data to the available caching space. In another implementation, the method comprises receiving a request to repair an encroached track in an SMR band, recovering encroached data to a dynamic random-access memory, determining whether caching space is available, writing the recovered data to the available caching space upon determining that caching space is available, and merging other cached data in the SMR band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
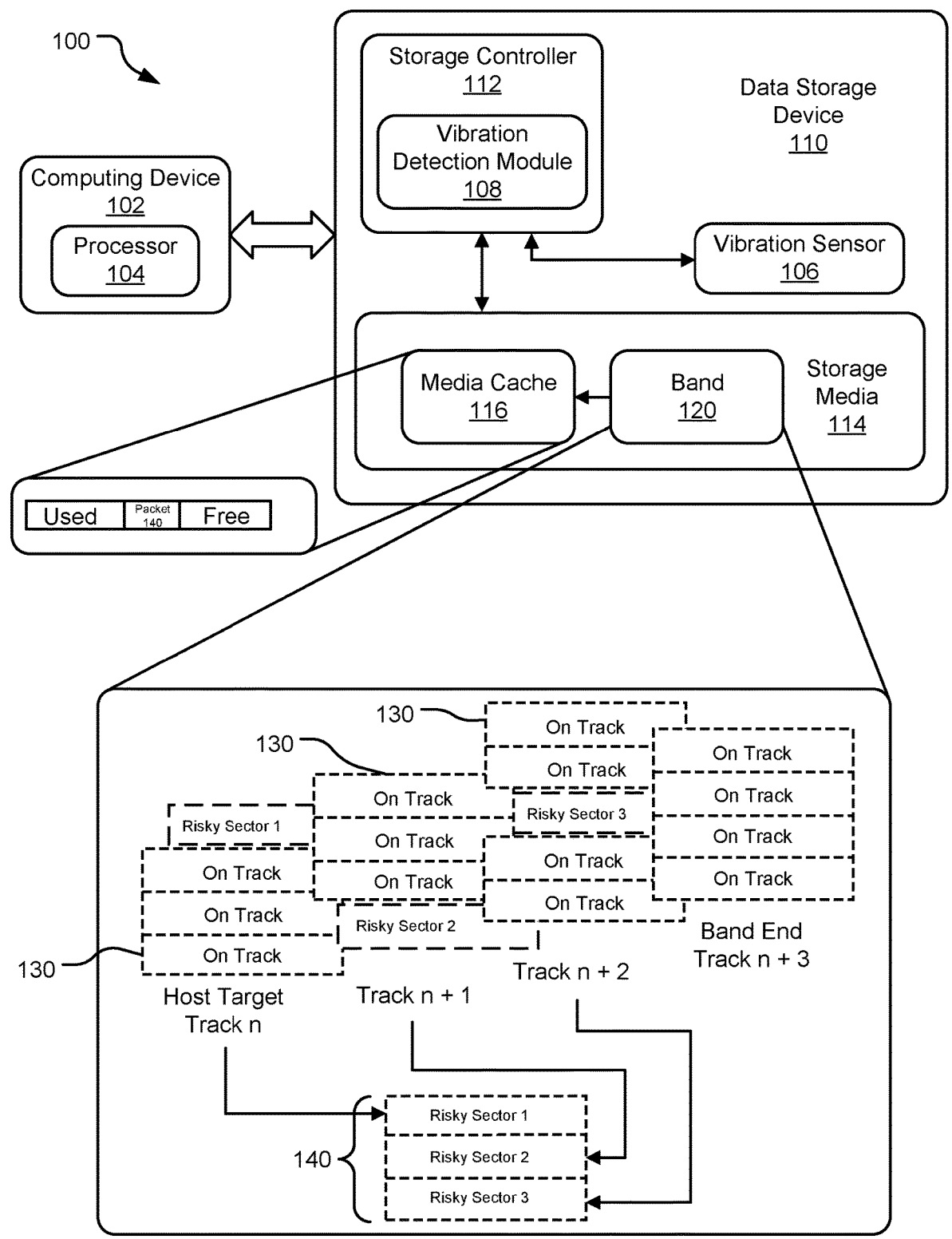
FIG. 1 is a schematic diagram of an example data storage system.

Host command completion time (CCT) is a useful measure of storage device performance. Several factors may impact CCT. For example, disc write retry operations can impact CCT. When vibration occurs, such as when music is playing, off-track write can occur frequently and trigger write retry operations. In another example, a background media scan, such as direct off-line scan (DOS), can also impact CCT. DOS repairs (or rewrites) the sectors/tracks encroached by adjacent track interference (ATI). A DOS operation may block a host command and cause an increased CCT. Such factors can amplify problems on a band in a shingled magnetic recording (SMR) drive.

An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten. In SMR, a write element may be large enough to affect two adjacent data tracks on a single pass. If the write element is displaced from a target position by vibrations, adjacent tracks on either side of a target track can be affected.

Due to the nature of SMR, and discussed more in depth below, disc write retry operations and DOS rewrite operations can occur at tracks that are not in an updating range. As a result, the impact on CCT may be more serious than in a conventional magnetic recording (CMR) drive. In SMR drives, media cache technology may be used to solve the performance of random (or out-of-order) disc write operations. The present disclosure is directed to data storage systems that improve CCT by using cache space. The user data stored in media cache shall be restored to its natural band when an HDD is in an idle state (or no host commands). As a result, CCT is reduced.

The technology disclosed herein can be used with various data storage devices. Examples of such data storage devices include hard disc drives, solid state hybrid drives, solid state media such as NAND, NVRAM, Resistive RAM (ReRAM), Magnetic RAM (MRAM), Phase Change Memory (PCM), and other memory technologies.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an example data storage system 100, showing various functional components used to control the operation of a data storage device 110 (e.g., an SMR HDD, an SMR SSHD, an object storage device, etc.).

The data storage system 100 includes a computing or computing device 102 (e.g., a computer, a mobile device, the internet, etc.) operably connected to the data storage device 110, each of the computing device 102 and the data storage device 110 communicating with each other.

A processor 104 is located in the computing device 102. The processor 104 sends one or more read or write commands to a storage device controller 112 for execution. As control communication paths are provided between a computing device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a cache 116 that is either a storage area on the storage media 114 or another non-volatile memory accessible by the data storage device 110. In the depicted system 100, the cache 116 is a storage area on the storage media 114.

A band (e.g., a band 120) of shingled tracks (e.g., a shingled track 130) may also be located in the storage media 114. In FIG. 1, the shingled tracks 130 located in the band 120 are shown. An implementation of the shingled tracks 130 is arranged such that when data is written to one of the shingled tracks 130 (except for the last data track), a writing operation affects data on an adjacent track in a down-track direction.

A disturbance in the data storage device 100 may be caused by forces external or internal to the storage device. As used herein, the term "disturbance" refers to changes affecting an environment within a storage device including, for example, vibration. Disturbances such as impact shock and vibration can be a cause of problems in hard drive disc systems, particularly during write operations. If a disturbance occurs while data is being written to a storage medium, a write element may be knocked off of a target data track. As a result, data may be recorded incorrectly or become corrupted. Disturbances may be caused by a variety of forces, such as a user playing loud music from a laptop computer, vibrations due to cooling fans turning on or off, or external impact forces absorbed by an electronic device. As shown in FIG. 1, a vibration detection module 108 in the storage controller 112 can receive signals from a vibration sensor 106 in the data storage device 110 to determine if there are disturbances, such as vibrations in the data storage device 110.

In some recording systems, storage space is statically mapped so that each data block (e.g., a sector) is associated with a logical address assigned by a host computer. In these types of systems, a write operation affected by a disturbance can be retried at the statically mapped location until the write succeeds. However, write retries are time consuming, and may take a full spin period or revolution time of a magnetic media in the storage medium. If the frequency of disturbance-related write errors is large, throughput performance can decrease. These challenges are magnified in SMR systems.

In the case of an off-track write due to vibration, or other disturbance, the on-cylinder limit (OCLIM) or off-track limit may be increased during band writing so that disc retries can be reduced. Tightening OCLIM can reduce ATI, thereby reducing DOS activity. However, extra disc write retry operations can be introduced if write OCLIM is tightened, which eventually affects a drive throughput.

In the disclosed technology, data may be written to an SMR band 130. The vibration sensor 106 in the data storage device 110 may sense vibrations in the data storage device 110 and send signals to the vibration detection module 108 in the storage controller 112 for notification of the vibrations. The controller can determine whether an off-track write has occurred due to the vibrations. If an off-track write has occurred, unsafe written data may be identified. The off-track written sectors on each track are defined herein as "unsafe written data" or "risky sectors" (shown as Risky Sector 1, Risky Sector 2, and Risky Sector 3).

If caching space is available, the risky sectors may be recorded and written to media cache 116 as one packet (e.g., packet 140) at the end of band writing. As shown in FIG. 1, the media cache 116 has "used" and "free" space. The packet 140 may be stored in the media cache 116. CCT is reduced by using available media cache 116 to store the risky sectors. Data may continue to be written to the SMR band without any write retry operations. When the data storage device 110 is in an idle state, the cached data may be transferred back to the SMR band.

If no caching space is available for the unsafe written data, then a write retry operation may be performed, and then a normal disc write operation.

Figure 2:
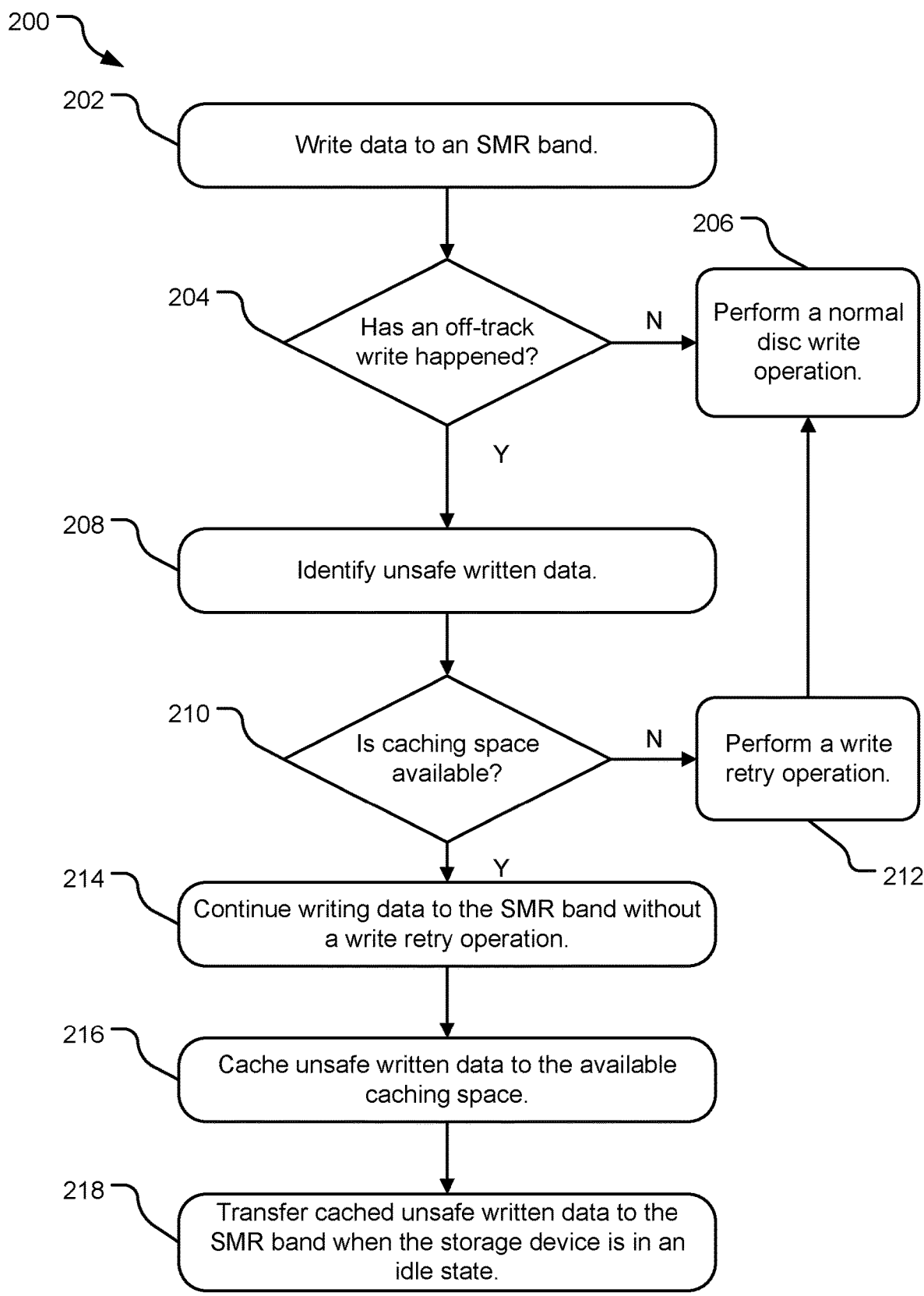
FIG. 2 is a flowchart of example operations for reducing command completion time in a shingled magnetic recording storage system.

FIG. 2 is a flowchart of example operations 200 for reducing command completion time in an SMR storage system. An operation 202 writes data to an SMR band in a storage device. A disturbance in the SMR storage system may be caused by forces external or internal to the storage device. If a disturbance occurs while data is being written to the SMR storage system, a write element may be knocked off a target data track. As a result, data may be recorded incorrectly or become corrupted in an "off-track write."

An operation 204 determines whether an off-track write has occurred. If an off-track write has not occurred, then an operation 206 performs a normal disc write operation.

If an off-track write has occurred, an operation 208 identifies any unsafe written data. An operation 210 determines whether caching space in the media cache is available. If caching space is not available, an operation 212 performs a write retry operation, and then the operation 206 performs a normal disc write operation.

If operation 210 determines caching space is available, an operation 214 continues writing the SMR band with a write retry operation. An operation 216 writes unsafe written data to the available caching space. The unsafe written data (or "risky sectors") may be "packed" and written as one packet to be stored in the available caching space. An operation 218 transfers cached data to the SMR band when the drive is in an idle state.

Figure 3:
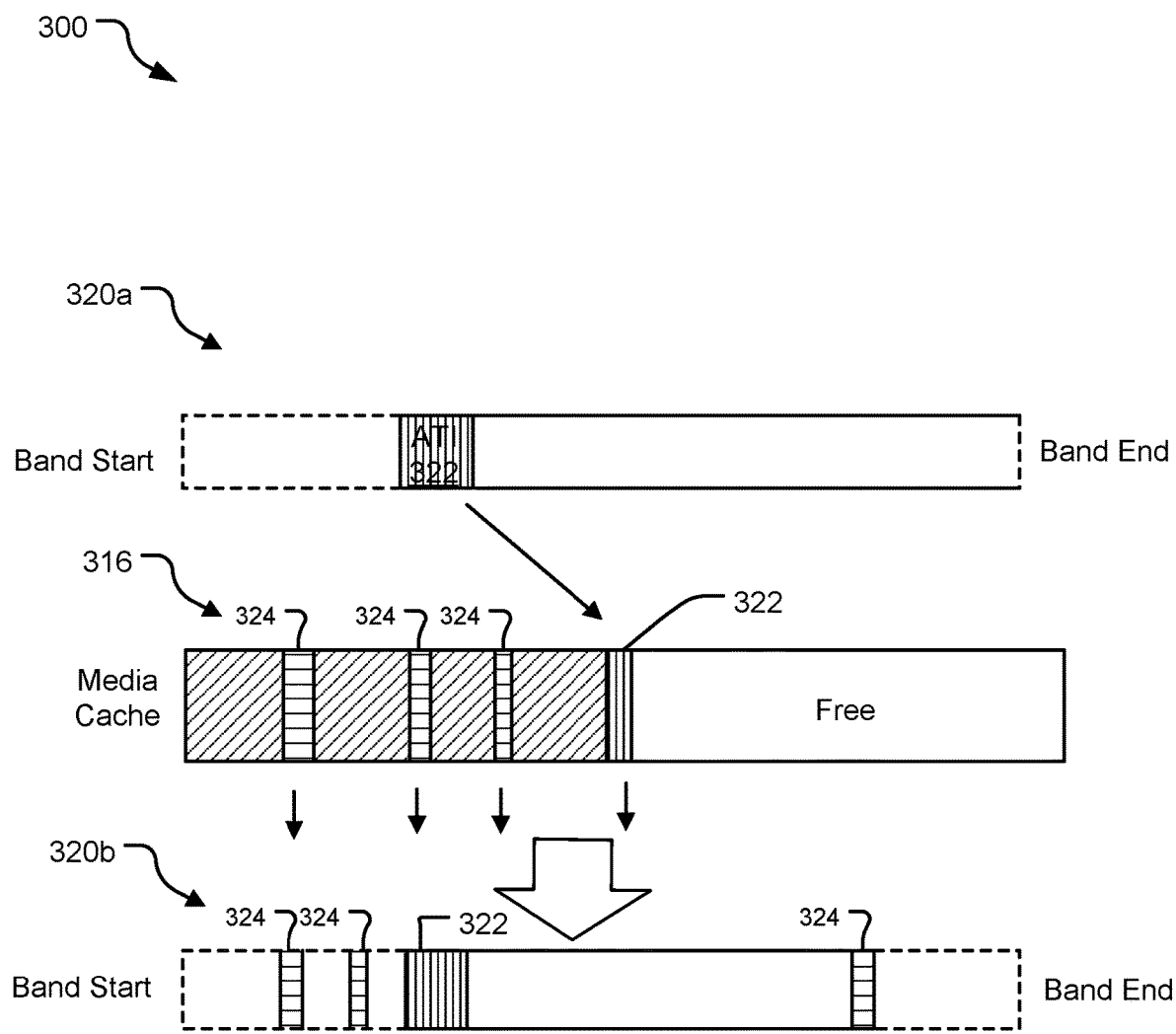
FIG. 3 is a schematic diagram of an example data storage system.

FIG. 3 is a schematic diagram 300 showing how caching space may be used to reduce CCT in an SMR drive. On a band-based SMR drive, partial band writing or writing from the middle of a band (e.g., band 320a) may introduce more ATI due to a higher track per inch (TPI). In shingled recording, only one side of an adjacent track may be affected.

In the case of a DOS operation, a background ATI repair scheme based on write count, a scan of a data track after a particular number of data writes to an immediately adjacent or near data track. A DOS operation records the write count to physical tracks and starts a background scan/refresh operation to recover the tracks that have been encroached by ATI. A DOS operation measures the track degradation by write count. The higher the write count, the more encroachment is determined.

In SMR implementations, a track repair process may read and rewrite full/partial band range even if only one track requires repair, which may introduce a much longer CCT and significant processing overhead. For example, the DOS band repair may take approximately 1000 ms. A DOS operation may significantly impact user CCT time.

In certain disc aggressive applications, such as playing computer games, surveillance or multiple video streaming, a long CCT can interrupt the host and user experience may be affected. In surveillance, for example, security gaps may arise. Tightening OCLIM can reduce ATI, thereby reducing DOS activity. However, extra write retry operations can be introduced if write OCLIM is tightening, which eventually affects a drive throughput.

In some cases, the calculated band rewrite range of a high priority DOS task may be too large to meet CCT. The disclosed technology provides that a storage device may recover encroached sectors/tracks from the band (shown as 320a) and copy to the media cache (e.g., media cache 316) as one packet. In some implementations, recovering encroached sectors/tracks (shown as "ATI 322" in SMR band 320a) and copying to the media cache 316 as one packet 322 may take approximately 20 ms, significantly less time than a DOS operation. As a result, the high CCT caused by background DOS band repair is avoided. Additional space in the media cache 316 may be used with this method, however, the media cache cleaning efficiency (in an idle state) may be improved because the ATI tracks 322 can be transferred back to the SMR band together with other media cache segments (e.g., media cache segments 324) that belong to the same band (shown in band 320b) when the storage device is in an idle state. Thus, the overall SMR drive performance is improved.

Figure 4:
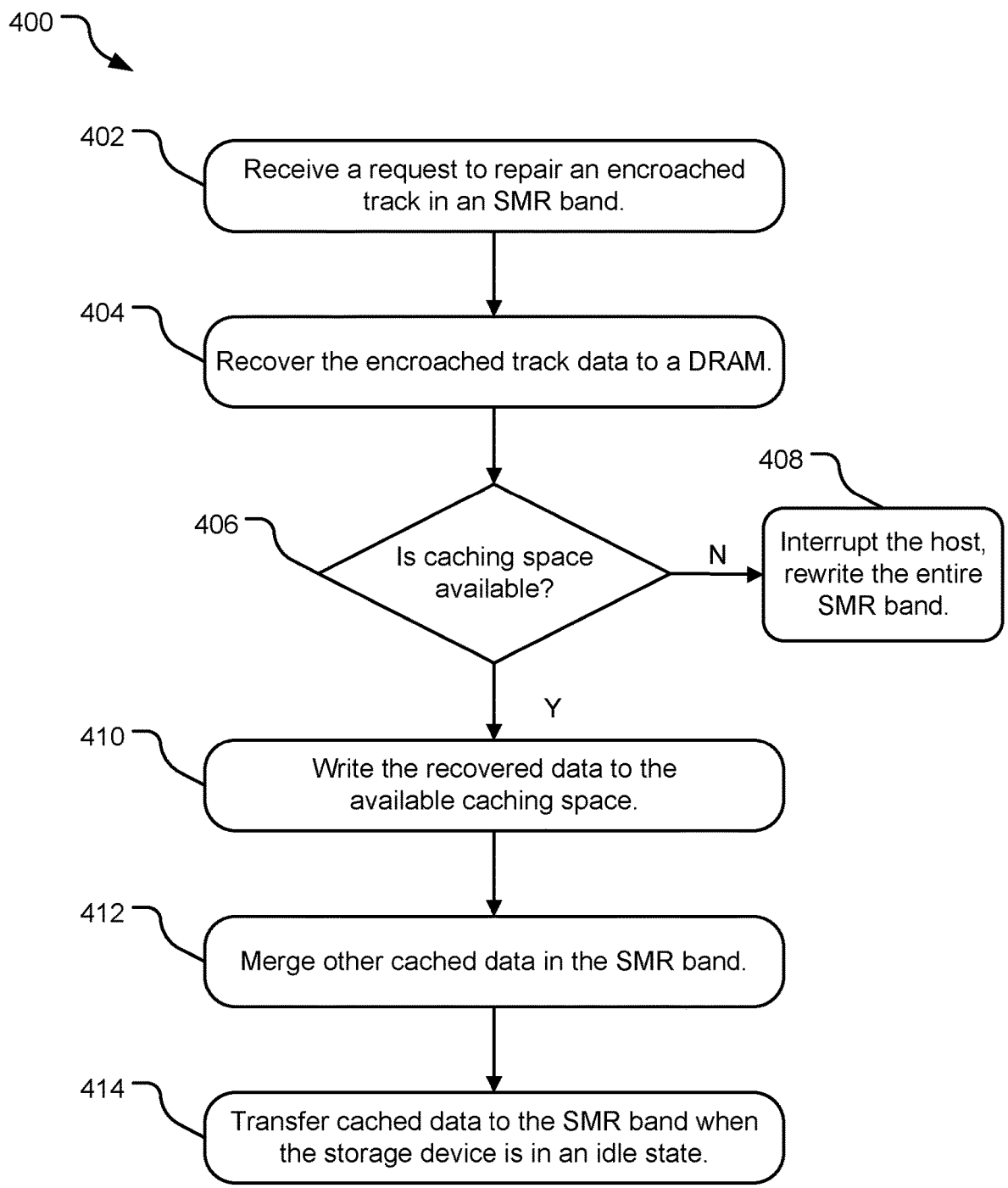
FIG. 4 is a flowchart of example operations for reducing command completion time in a shingled magnetic recording storage system.

FIG. 4 is a flowchart of example operations 400 for reducing CCT in a shingled magnetic recording storage system. An operation 402 receives a request to repair an encroached track in an SMR band. The track may be encroached from ATI. The request may be a DOS request, for example. An operation 404 recovers the encroached track data to a DRAM.

An operation 406 determines whether caching space in the media cache is available. If caching space is not available, an operation 408 interrupts the host and the entire SMR band is rewritten.

If caching space is available, an operation 410 writes recovered data to the available caching space. An operation 412 merges other cached data in the SMR band. In some implementations, "other cached data" may be non-recovered data in the SMR band. In some implementations, "other cached data" may be a combination of recovered and non-recovered data. An operation 414 transfers cached data to the SMR band when the storage device is in an idle state.

Figure 5:
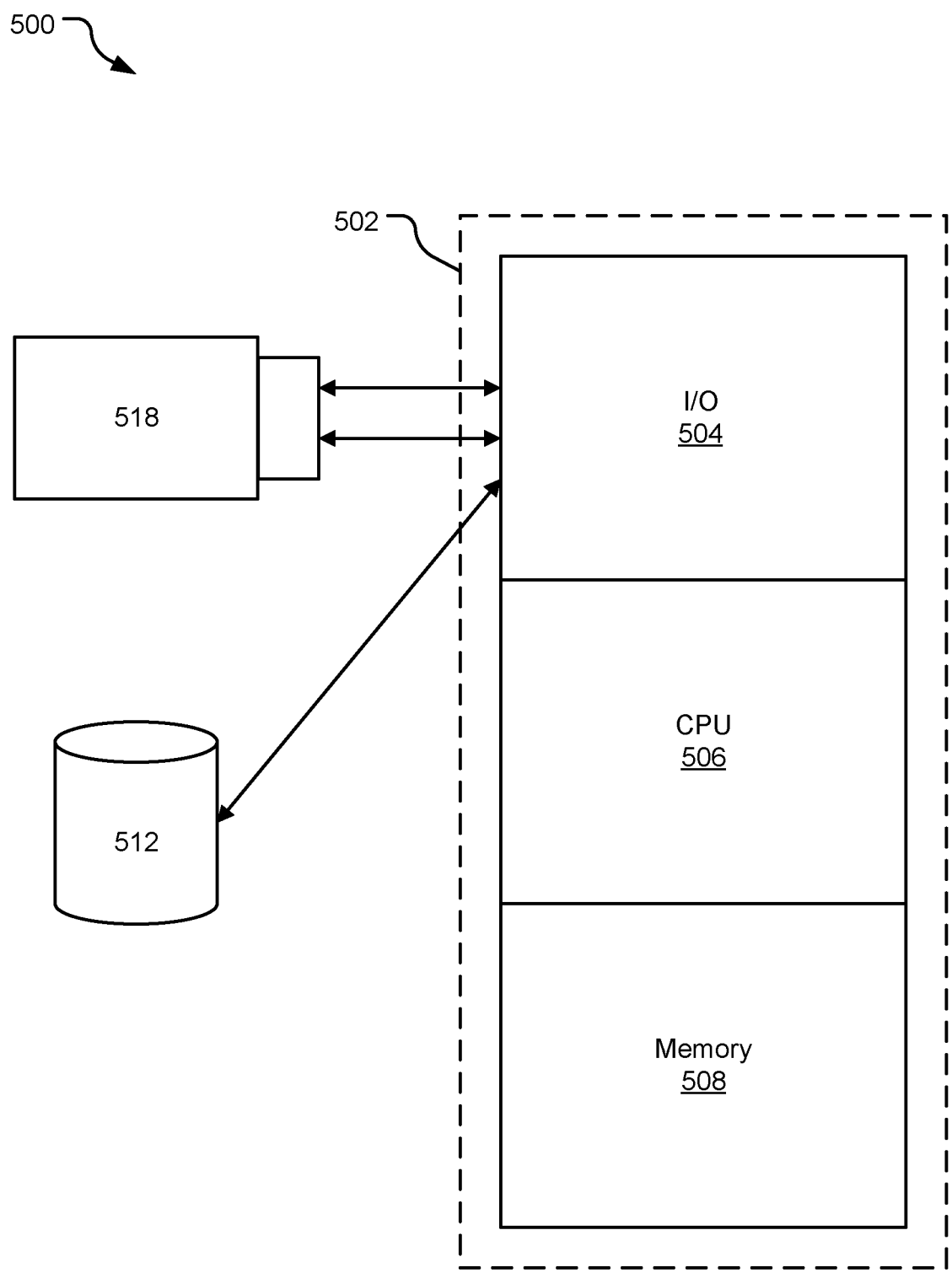
FIG. 5 is a block diagram of an example computer system suitable for implementing the technology disclosed herein.

FIG. 5 discloses a block diagram of a computer system 500 suitable for implementing the improved CCT in SMR processes disclosed herein. Computer system 500 is capable of executing a computer program product embodied in a tangible computer-readable storage medium to execute a computer process. The tangible computer-readable storage medium is not embodied in a carrier-wave or other signal. Data and program files may be input to computer system 500, which reads the files and executes the programs therein using one or more processors. Some of the elements of a computer system are shown in FIG. 5, where a processor 502 is shown having an input/output (I/O) section 504, a Central Processing Unit (CPU) 506, and a memory 508. There may be one or more processors 502, such that processor 502 of system 500 has a single central-processing unit or a plurality of processing units. System 500 further includes a controller, not shown in FIG. 5, configured to designate a plurality of non-contiguous storage areas on the storage media as media scratch pads; the controller may be software, firmware, or a combination thereof. System 500 may be a conventional computer, a distributed computer, or any other type of computer. The described technology is optionally implemented in software loaded in memory 508, a disc storage unit 512, or removable memory 518.

In an example implementation, the process of decreasing CCT in SMR devices may be embodied by instructions stored in memory 508 and/or disc storage unit 512 and executed by CPU 506. Further, local computing system, remote data sources and/or services, and other associated logic represent firmware, hardware, and/or software which may be configured to adaptively distribute workload tasks to improve system performance. The disclosed methods may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 508 and/or disc storage unit 512 and executed by processor 502.

The implementations of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A method comprising:
   receiving a request to repair an encroached track within a shingled magnetic recording (SMR) band of a storage drive;
   recovering encroached data from the encroached track to memory;
   determining that caching space is available;
   writing the recovered data to the available caching space; and
   merging other data with the recovered data within the caching space.

2. The method of claim 1, further comprising:
   transferring the merged data from the caching space to the SMR band when the storage device is in an idle state.

3. The method of claim 1, further comprising:
   packing the encroached data as one packet prior to writing the recovered data to the available caching space.

4. The method of claim 1, further comprising:
   receiving another request to repair an encroached track within another SMR band of the storage drive;
   recovering encroached data pertaining the another request from the encroached track to memory;
   determining that caching space is unavailable for the encroached data pertaining the another request; and
   interrupting a host of the storage drive to rewrite the another SMR band upon determining that the caching space is unavailable.

5. The method of claim 1, wherein the memory is dynamic random-access memory (DRAM).

6. The method of claim 1, wherein the request is received responsive to a direct off-line scan (DOS).

7. The method of claim 1, wherein the encroached track is encroached from adjacent track interference (ATI).

8. A storage device system, comprising:
   a shingled magnetic recording (SMR) band;
   a media cache; and
   a storage controller configured to:
      receive a request to repair an encroached track within the SMR band;
      recover encroached data from the encroached track to memory;
      determine that caching space within the media cache is available;
      write the recovered data to the available caching space; and
      merge other data with the recovered data within the media cache.

9. The storage device system of claim 8, wherein the storage controller is further configured to:
   transfer the merged data from the media cache to the SMR band when the storage device system is in an idle state.

10. The storage device system of claim 8, wherein the storage controller is further configured to:
    pack the encroached data as one packet prior to writing the recovered data to the available caching space.

11. The storage device system of claim 8, further comprising:
    another SMR band, wherein the storage controller is further configured to:
       receive another request to repair an encroached track within the another SMR band;
       recover encroached data pertaining the another request from the encroached track to memory;
       determine that caching space within the media cache is unavailable for the encroached data pertaining the another request; and
       interrupt a host of the storage device system to rewrite the another SMR band upon determining that the caching space is unavailable.

12. The storage device system of claim 8, wherein the memory is dynamic random-access memory (DRAM).

13. The storage device system of claim 8, wherein the request is received responsive to a direct off-line scan (DOS).

14. The storage device system of claim 8, wherein the encroached track is encroached from adjacent track interference (ATI).

15. One or more tangible computer-readable storage media encoding computer-executable instructions for executing on a computer system a computer process, the computer process comprising:
    receiving a request to repair an encroached track within a shingled magnetic recording (SMR) band of a storage drive;
    recovering encroached data from the encroached track to memory;
    determining that caching space is available;
    writing the recovered data to the available caching space; and
    merging other data with the recovered data within the caching space.

16. The one or more tangible computer-readable storage media of claim 15, wherein the computer process further comprises:
    transferring the merged data from the caching space to the SMR band when the storage device is in an idle state.

17. The one or more tangible computer-readable storage media of claim 15, wherein the computer process further comprises:
    packing the encroached data as one packet prior to writing the recovered data to the available caching space.

18. The one or more tangible computer-readable storage media of claim 15, wherein the computer process further comprises:
    receiving another request to repair an encroached track within another SMR band of the storage drive;
    recovering encroached data pertaining the another request from the encroached track to memory;

determining that caching space is unavailable for the encroached data pertaining the another request; and interrupting a host of the storage drive to rewrite the another SMR band upon determining that the caching space is unavailable.

19. The one or more tangible computer-readable storage media of claim 15, wherein the memory is dynamic random-access memory (DRAM).

20. The one or more tangible computer-readable storage media of claim 15, wherein the request is received responsive to a direct off-line scan (DOS).

* * * * *